US008918148B2

(12) United States Patent
Woo et al.

(10) Patent No.: US 8,918,148 B2
(45) Date of Patent: Dec. 23, 2014

(54) SYSTEMS AND METHODS FOR CONTROLLING SENSOR DEVICES IN MOBILE DEVICES

(75) Inventors: Sungho Woo, Gyeonggi-Do (KR); Jaeyoung Choi, Seoul (KR); Hoon Jo, Gyeonggi-Do (KR); Hyeonchang Choi, Gyeonggi-Do (KR); Jongseok Park, Gyeonggi-Do (KR); Okhyun Jeong, Seoul (KR); Giwon Kang, Seoul (KR); Hong Jo Shim, Seoul (KR); Jungseok Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 13/277,056

(22) Filed: Oct. 19, 2011

(65) Prior Publication Data

US 2012/0213136 A1    Aug. 23, 2012

Related U.S. Application Data

(63) Continuation-in-part of application No. 13/042,380, filed on Mar. 7, 2011, now Pat. No. 8,824,346.

(60) Provisional application No. 61/445,975, filed on Feb. 23, 2011.

(51) Int. Cl.
| H04M 1/00 | (2006.01) |
| G08C 17/00 | (2006.01) |
| H02J 7/02 | (2006.01) |
| G06F 1/32 | (2006.01) |

(52) U.S. Cl.
CPC .............. *H02J 7/025* (2013.01); *G06F 1/3287* (2013.01); *G06F 1/3209* (2013.01); *Y02B 60/50* (2013.01)
USPC ........................................... 455/574; 370/311

(58) Field of Classification Search
CPC .............................. G06F 1/3287; G06F 1/3293
USPC ........................... 370/342, 311; 455/522, 573
See application file for complete search history.

(56) References Cited

U.S. PATENT DOCUMENTS

| 7,208,916 B1 | 4/2007 | Boatwright et al. |
| 8,618,934 B2 * | 12/2013 | Belov et al. ................ 340/539.3 |

(Continued)

FOREIGN PATENT DOCUMENTS

| CN | 101668350 | 3/2010 |
| CN | 1698339 | 6/2010 |

OTHER PUBLICATIONS

U.S. Appl. No. 13/042,380, Office Action dated May 6, 2013, 34 pages.

(Continued)

*Primary Examiner* — Dang Ton
*Assistant Examiner* — Ryan Kavleski
(74) *Attorney, Agent, or Firm* — Lee, Hong, Degerman, Kang & Waimey

(57) ABSTRACT

Systems and methods for controlling one or more sensor devices are disclosed. In one embodiment, a system of a mobile device for controlling one or more sensor devices comprises an application processor (AP), a low power personal area network (PAN) module configured to wirelessly communicate with an external device for establishing a connection with the external device, at least one sensor device, and a controller coupled to the AP, the low power PAN module and the at least one sensor device. The controller is configured to monitor a connection request signal communicated from the external device via the low power PAN module while the AP is in a sleep mode, and generate sensor data by processing each signal from the at least one sensor device during the sleep mode, where the controller is supplied with quiescent current from a battery of the mobile device during the sleep mode.

18 Claims, 11 Drawing Sheets

(56) References Cited

U.S. PATENT DOCUMENTS

| | | | |
|---|---|---|---|
| 8,775,126 B2* | 7/2014 | Yang | 702/187 |
| 2004/0121802 A1 | 6/2004 | Kim et al. | |
| 2005/0138138 A1 | 6/2005 | Jelinek et al. | |
| 2006/0112287 A1* | 5/2006 | Paljug | 713/300 |
| 2007/0205872 A1* | 9/2007 | Kim et al. | 340/10.33 |
| 2008/0067995 A1 | 3/2008 | Chua-Eoan et al. | |
| 2010/0022217 A1 | 1/2010 | Ketari | |
| 2010/0039284 A1* | 2/2010 | Hall et al. | 340/825.36 |
| 2010/0205467 A1* | 8/2010 | Park | 713/320 |
| 2010/0304761 A1* | 12/2010 | Seibert et al. | 455/456.4 |
| 2011/0021142 A1 | 1/2011 | Desai et al. | |
| 2011/0086615 A1* | 4/2011 | Golder | 455/411 |
| 2011/0148349 A1* | 6/2011 | Kim et al. | 320/108 |
| 2012/0023236 A1* | 1/2012 | Backholm et al. | 709/226 |
| 2012/0303476 A1* | 11/2012 | Krzyzanowski et al. | 705/26.5 |
| 2012/0315845 A1* | 12/2012 | Buczek | 455/41.1 |

OTHER PUBLICATIONS

The State Intellectual Property Office of the People's Republic of China Application Serial No. 201110187018.3, Office Action dated Nov. 11, 2013, 9 pages.

U.S. Appl. No. 13/233,977, Office Action dated Jan. 16, 2014, 24 pages.

* cited by examiner

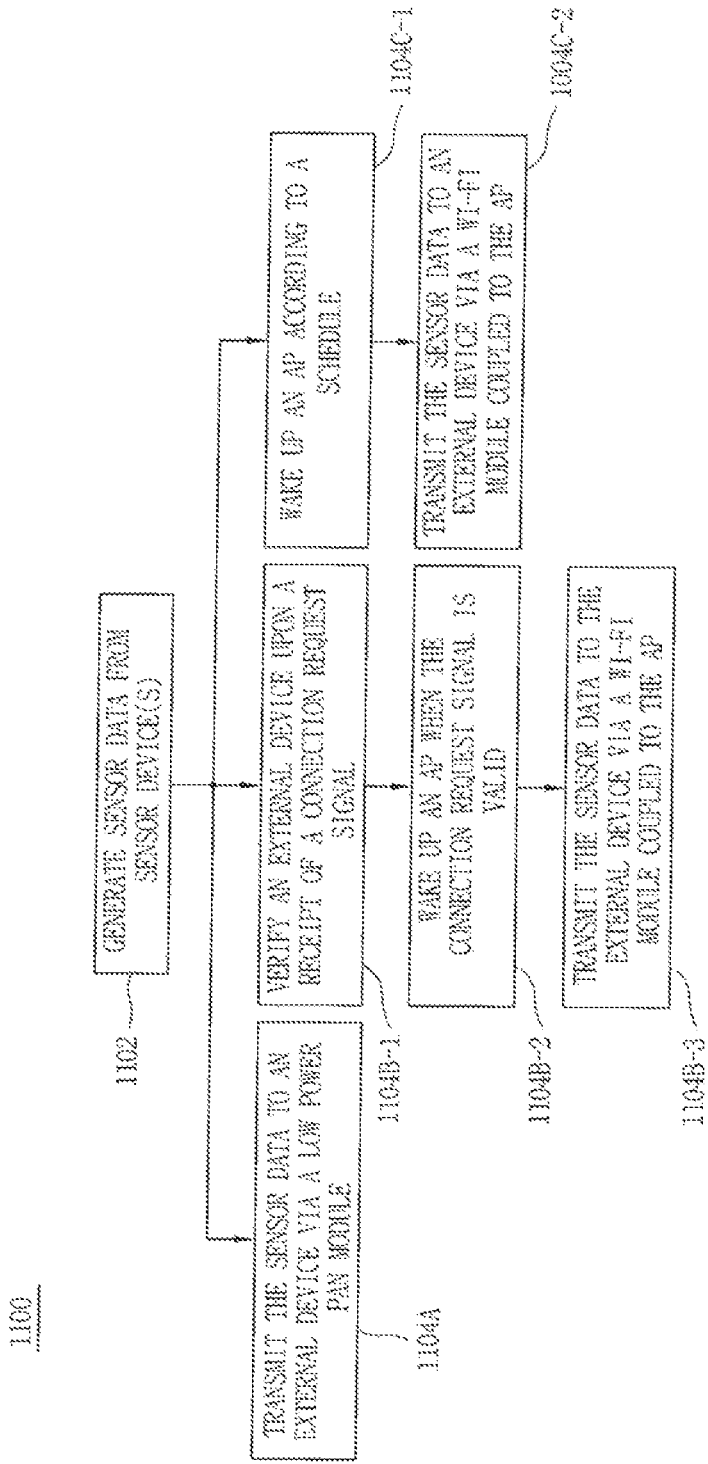

even though the smart phones are in stock, a bug or flaw
SYSTEMS AND METHODS FOR CONTROLLING SENSOR DEVICES IN MOBILE DEVICES

CROSS-REFERENCE TO RELATED APPLICATIONS

This application is a continuation-in-part application of U.S. patent application Ser. No. 13/042,380, filed on Mar. 7, 2011, now U.S. Pat. No. 8,824,346, which claims the benefit of U.S. Provisional Patent Application Ser. No. 61/445,975, filed on Feb. 23, 2011, the contents of which are hereby incorporated by reference herein in their entirety.

TECHNICAL FIELD

Embodiments of the disclosure generally relate to the field of electronics, and more particularly to control systems, circuits, and devices.

BACKGROUND

A mobile device is a pocket-sized computing device, typically having a display screen with touch input and/or a miniature keyboard. Some of the types of the mobile device include a mobile phone, a personal digital assistant (PDA), a tablet PC, a laptop, etc. As today's mobile devices become ever more dependant on their software, as in the case of smart phones, software upgrade to fix bugs or enhance the features of the mobile devices is becoming increasingly frequent. For example, companies are offering new versions of the smart phones twice year, where the new versions may have new and/or upgraded software and/or hardware features. The upgraded smart phones may be packaged and stored as an inventory until they are shipped out and sold to the consumers.

However, while the smart phones are in stock, a bug or flaw may be found with a certain software feature of the smart phones, such as the OS of the smart phones. In that case, the companies may manually take out the smart phones from their package, power up the application processor (AP) of each mobile phone, and then download a bug-free OS to each mobile phone.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Systems and methods for controlling one or more sensor devices are disclosed. In one aspect, a system of a mobile device for controlling one or more sensor devices comprises an application processor (AP), a low power personal area network (PAN) module configured to wirelessly communicate with an external device for establishing a connection with the external device, at least one sensor device, and a controller coupled to the AP, the low power PAN module and the at least one sensor device. The controller is configured to monitor a connection request signal communicated from the external device via the low power PAN module while the AP is in a sleep mode, and generate sensor data by processing each signal from the at least one sensor device during the sleep mode, where the controller is supplied with quiescent current from a battery of the mobile device during the sleep mode.

In another aspect, a method of a controller in a mobile device for controlling one or more sensor devices comprises monitoring a connection request signal communicated from an external device via a low power PAN module of the mobile device while an AP of the mobile device is in a sleep mode, generating sensor data by processing each signal from the one or more sensor devices during the sleep mode, and forwarding the sensor data to the external device.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 11 illustrates a process flow chart of an exemplary method of a mobile device for controlling one or more sensor devices, according to one embodiment.

Figure 1:
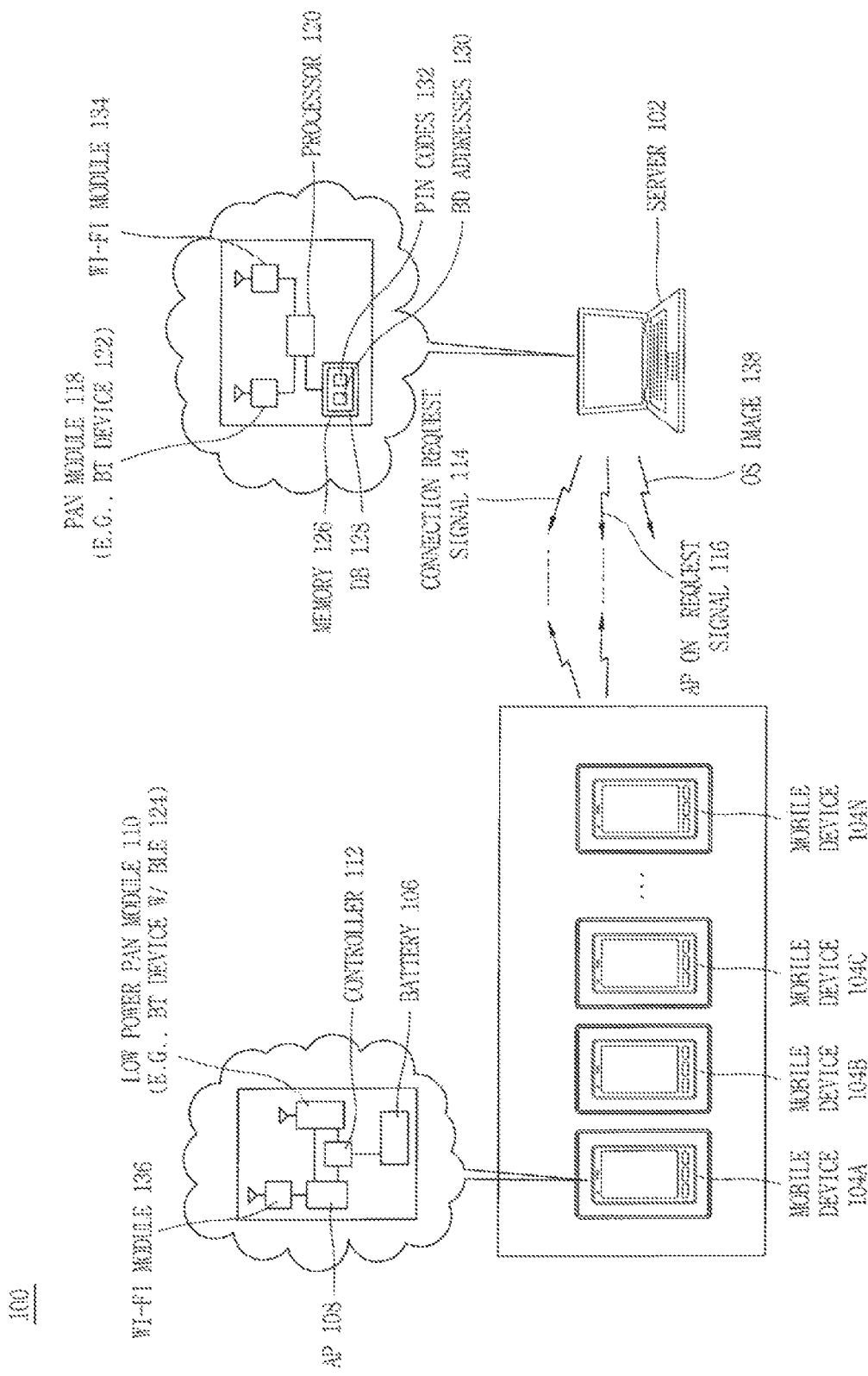
FIG. 1 illustrates an exemplary system for remotely waking up an application processor of a mobile device, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system that control one or more sensor devices are disclosed. According to embodiments of this disclosure, a system of a mobile device for controlling one or more sensor devices includes a low power personal area network (PAN) module, one or more sensor devices, and a controller of the low power PAN module and the sensor devices. The long battery life of the mobile terminal may be possible by maintaining the mobile device in a sleep mode, while the controller of the system monitors and/or processes signals from the sensor devices.

In one embodiment, the mobile device with the system for controlling one or more sensor devices using the low power controller instead of the AP may process signals from the sensor devices while the AP is in the sleep mode. Then, the controller generates sensor data by processing the signals, and forwards the sensor data to an external device via a low power PAN module, such as a BLUETOOTH low energy (BLE) device, without waking up the AP. In one embodiment, the controller receives and processes the signals from the sensor devices and stores the sensor data generated based on the signals. Then, the controller wakes up the AP according to a set schedule, forwards the sensor data using a WI-FI module of the mobile device, and then place the AP back to sleep when the transmission of the sensor data is completed. In one embodiment, the controller receives and processes the signals from the sensor devices and stores the sensor data generated based on the signals. Then, when a connection request signal from an external device is received, the controller verifies the external device and wakes up the AP if the connection request signal is determined to be valid. Then, the AP forwards the sensor data using a WI-FI module of the mobile device, and places the AP back to sleep when the transmission of the sensor data is completed.

According to the various embodiments of the present disclosure, the low power controller controls one or more sensor devices of the mobile devices, where the AP is maintained in the sleep mode, and then forwards the sensor data using a BLE device associated with the controller or by using a WI-FI device once the AP is awakened. Thus, the system and/or device where the sensor devices are directly controlled by the low power controller instead of the AP may reduce the operation current or power consumed by the mobile device, thus prolonging the battery life of the mobile device.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary system 100 for remotely waking up application processors of mobile devices 104A-N, according to one embodiment. In one embodiment, the system 100 comprises a server 102 and the multiple mobile devices 104A-N. It is appreciated that the server 102 may be a work station, a desktop, a laptop, a tablet PC, etc. which functions as the master device. It is further appreciated that each of the multiple mobile devices 104A-N may function as a slave device. Each of the multiple mobile devices 104A-N comprises a battery, an application processor (AP), a low power personal area network (PAN) module, and a controller for the low power PAN module. For example, the mobile device 104A comprises a battery 106, an AP 108, and a low power personal area network (PAN) module 110 configured to communicate with the server 102 for establishing a connection with the server 102. It is appreciated that the low power PAN module may be a wireless IRDA, BLUETOOTH, UWB, Z-WAVE, and ZIGBEE, and the lower power PAN module is designed to consume minimal amount of power. For example, a BT device with BLUETOOTH low energy (BLE) feature may consume a fraction (e.g., 1 to 5 percent) of the power of conventional BT device. It is further appreciated that the AP or application processor may be a system on chip (SoC) which include one or more of core(CPU), memory, display system/controller, multimedia en/decoding codec, 2D/3D accelerator engine, ISP(Image Signal Processor), camera, audio, modem, various high & low speed serial/parallel connectivity interface, etc.

The mobile device 104A further comprises a controller 112 for the low power PAN module 110 configured to process a connection request signal 114 from the server 102 and to wake up the AP 108 of the mobile device 104A in response to an AP on request signal 116 from the server 102 when the connection request signal 114 from the server 102 is verified as valid. The controller 112 is supplied with quiescent or insignificant current from the battery 106 of the mobile device 104A prior to the wake up of the AP 108. It is appreciated that each of the remaining mobile devices 104B-N comprises the same or equivalent features described in regard to the mobile device 104A.

In one embodiment, the server 102 comprises a PAN module 118 and a processor 120 configured to generate the connection request signal 114 and the AP on request signal 116. Alternatively, the PAN module 118 may be implemented as a dongle that can be freely attached or detached based on the need. In one exemplary implementation, the PAN module 118 of the server 102 comprises a BLUETOOTH (BT) device 122, and the low power PAN module 110 of the mobile device 104A comprises a BT device with BLE feature 124. The server 102 further comprises a memory 126 which stores a database (DB) 128 comprising addresses of BLUETOOTH devices with BLE feature (BD addresses) 130 for the mobile devices 104A-N and personal identification number (PIN) codes 132 designated for the mobile devices 104A-N, respectively. It is appreciated that the BD addresses 130 may store the network addresses of BT enabled devices, such as the devices 104A-N. The BD addresses 130 may be a unique number (e.g., in 48 bits) used to identify a particular device during operations such as connecting to, pairing with, or activating the device.

In one embodiment, a pairing of the server 102 and each of the mobile devices 104A-N is performed based on the BD addresses 130 and the PIN codes 132 designated for the mobile devices 104A-N. In one exemplary implementation, each of the PIN codes 132 may be a 4-digit personal ID code based on the serial number of the mobile device and/or the version of OS to be downloaded to the mobile device. The server 102 is configured to request the connection with the server 102 to each mobile device (e.g., the mobile device 104A) according to a particular profile dictated by the server 102, and each mobile device is configured to accept the request. In addition, the server 102 and each mobile device are configured to implement a protocol for the wake up of a corresponding AP (e.g., the AP 108).

Further, each mobile device is configured to perform the wake up of its AP upon receipt of its AP on request signal. The controller of each mobile device is configured to measure a level of its battery upon receipt of the AP on request signal, and the wake up of the AP is performed when the level of the battery is higher than a threshold level. For example, the controller 112 of the mobile device 104A is configured to measure the level of the battery 106 upon receipt of the AP on request signal 116, and the wake up of the AP 108 is performed when the level of the battery 106 is higher than a threshold level. In case the level of the battery 106 is lower than the threshold level, the mobile device may forward its status report to the server 102 without turning on the AP 108.

Further, the server 102 further comprises a Wi-Fi module 134, and each mobile device comprises a Wi-Fi module. For example, the mobile device 104A comprises a Wi-Fi module 136. In one embodiment, a download of an OS image 138 stored in the server 102 to each mobile device is performed via the Wi-Fi module 134 of the server 102 and the Wi-Fi module of each mobile device. In one exemplary implementation, the controller for the low power PAN module may be disabled when the download of the OS image is completed or the subject mobile device is in use.

Although the system 100 of FIG. 1 is described in terms of single server and each mobile device, it is appreciated that the process of connecting the mobile device 104A and performing a task remotely commanded by the server 102 may be simultaneously or serially performed for all of the mobile devices 104A-N. For example, if the low power PAN module in each mobile device is a BT device with BLE feature, the server 102, which is the master device, may form a piconet with seven slave devices, such as seven BT devices with BLE feature. Accordingly, the server 102 and the seven BT devices may communicate in serial or parallel to connect and wake up a corresponding AP of each mobile device. Alternatively, more than eight devices may be connected based on a scatternet so that the communication between the server 102 and the mobile devices can be performed in a rapid fashion.

Figure 2:
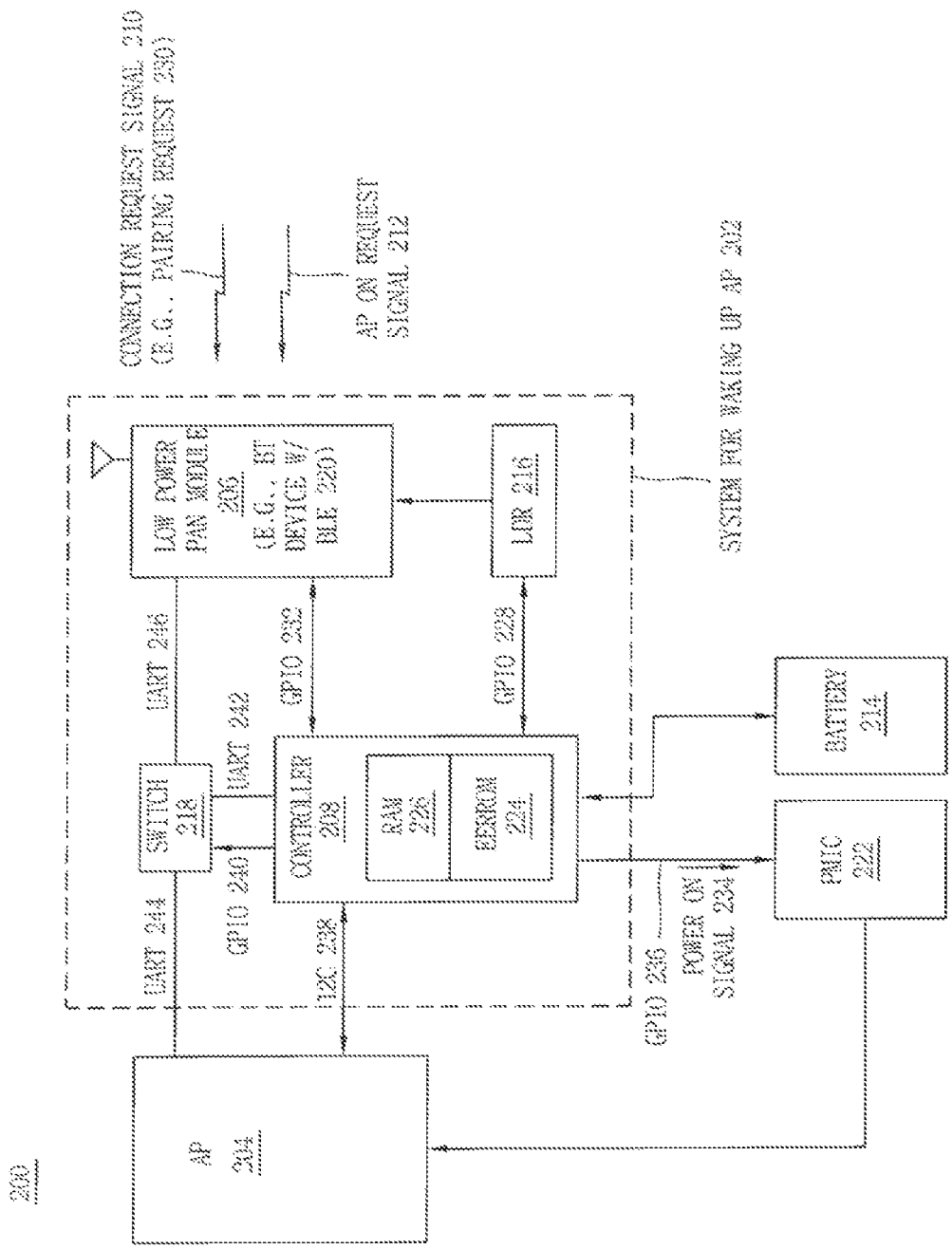
FIG. 2 illustrates an exemplary system for waking up an application processor (AP) of a mobile device, according to one embodiment.

FIG. 2 illustrates an exemplary system for waking up an application processor (AP) 202 of a mobile device 200, according to one embodiment. It is appreciated that the mobile device 200 is an exemplary embodiment of the mobile device 104A or any one of the mobile devices 104B-N in FIG. 1. In one embodiment, the system 202 comprises a low power personal area network (PAN) module 206 configured to communicate with an external device for establishing a connection with the external device. The system 202 further comprises a controller 208 for the low power PAN module 206 configured to process a connection request signal 210 from the external device and to wake up an AP 204 of the mobile device 200 in response to an AP on request signal 212 from the external device when the connection request signal 210 from the external device is verified as valid, where the controller 208 is supplied with quiescent current from a battery 214 of the mobile device 200 prior to the wake up of the AP 204.

The system 202 also comprises a low dropout regulator (LDO) 216 configured to maintain a voltage supplied to the low power PAN module 206. The system 202 further comprises a switch 218 configured to open a connection between the AP 204 and the low power PAN module 206 prior to the wake up of the AP 204 and to close the connection upon the wake up of the AP 204. In one exemplary implementation, the low power PAN module 206 comprises a BLUETOOTH device with BLE feature 220.

In one embodiment, the mobile device 200 comprises the battery 214, the AP 204, the low power PAN module 206, and the controller 208. The mobile device 200 further comprises the LDO 216, the switch 218, and a power management integrated circuit (PMIC) 222 configured to control a power supplied to the AP 204. It is appreciated that the mobile device 200 is an exemplary implementation of any one of the mobile devices 104A-N.

In one embodiment, the controller 208 is initialized when the battery 214 is installed to the mobile device 200. For example, during the initialization, the setting for general purpose input/outputs (GPIOs) of the controller 208 and the profile of the BT device with BLE feature 220 stored in EEPROM 224 of the controller 208 may be loaded to a RAM 226 of the controller 208. Further, the controller 208 is configured to perform a power on sequence of the BLUETOOTH device with BLE feature 220 by controlling the LDO 216 via a general purpose input/output (GPIO) 228 of the controller 208. The controller 208 is also configured to perform a pairing with the external device based on a pairing request 230 from the external device forwarded via a GPIO 232 of the controller 208. Prior to the powering up of the AP 204, the system for waking up AP 202 may be maintained with a quiescent current 248 supplied by the battery 214.

The controller 208 is further configured to forward a power on signal 234 via a GPIO 236 to the PMIC 222 to wake up the AP 204 in response to the AP on request signal 212 from the external device. Moreover, the controller 208 is configured to operate the switch 218 (e.g., using GPIO 240 and/or UART 242) to transfer a control of the BLUETOOTH device with BLE feature 220 to the AP 204. Subsequently, data is communicated directly between the AP 204 and the BT device with BLE feature 220. In one exemplary implementation, the controller 208 may be physically separate from the low power PAN module 206. In another exemplary implementation, the controller 208 may be a part of the low power PAN module 206 together with the LDO 216 and the switch 218. In yet another exemplary implementation, the controller 208 may be a part of the AP 204, yet islanded within the AP 204 so that the controller 208 can be operated without waking up the AP 204 prior to the receipt of the AP on request 212 from the external device.

Figure 3:
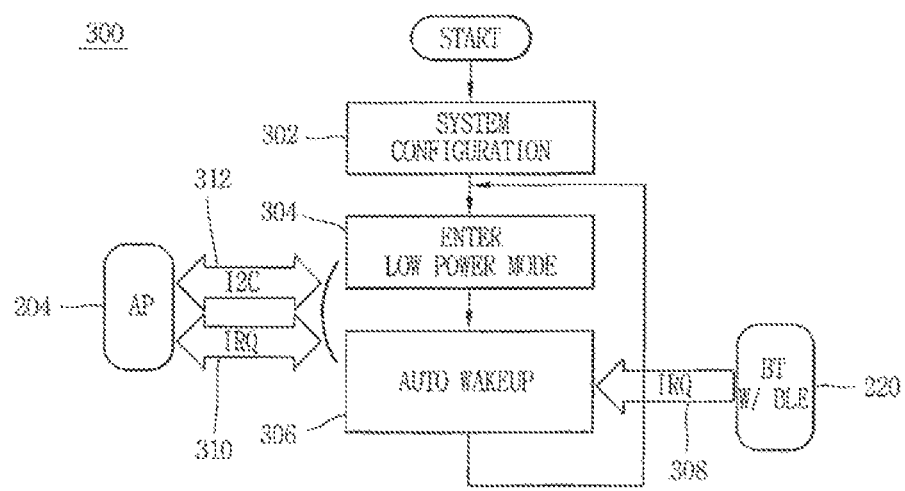
FIG. 3 illustrates a flow graph of an exemplary system for waking up an application processor of a mobile device, according one embodiment.

FIG. 3 illustrates an exemplary flow graph 300 of the system of the mobile device 200 in FIG. 2, according one embodiment. In operation 302, configurations of the system for waking up AP 202 are performed. It is appreciated that the system for waking up AP 202 may be a stand alone device (e.g., in a chip) or a part of the BT device with BLE feature 220 (e.g., or any other type of a low power PAN module). In addition, in operation 304, the system for waking up AP 202 enters a low power mode, where in one exemplary implementation, only 300 uA or less amount of current is drawn by the system for waking up AP 202. During the low power mode, the controller 208 of the system for waking up AP 202 monitors a signal from the BT device with BLE feature 220.

In operation 306, when an interrupt request (IRQ 308) is received from the BT with BLE feature 220, the controller 208 automatically wakes up the AP 204 via forwarding an interrupt request (IRQ 310) when authentication data forwarded from the BT with BLE feature 220 (e.g., as a part of a pairing request signal) is verified to be valid and an AP on request signal forwarded from the BT with BLE feature 220 is received and acknowledged by the controller 208. Then, the controller 208 communicates with the AP 204 via an inter-integrated circuit (I2C 312) to transfer its control over the BT with BLE feature 220 to the AP 204.

Figure 4:
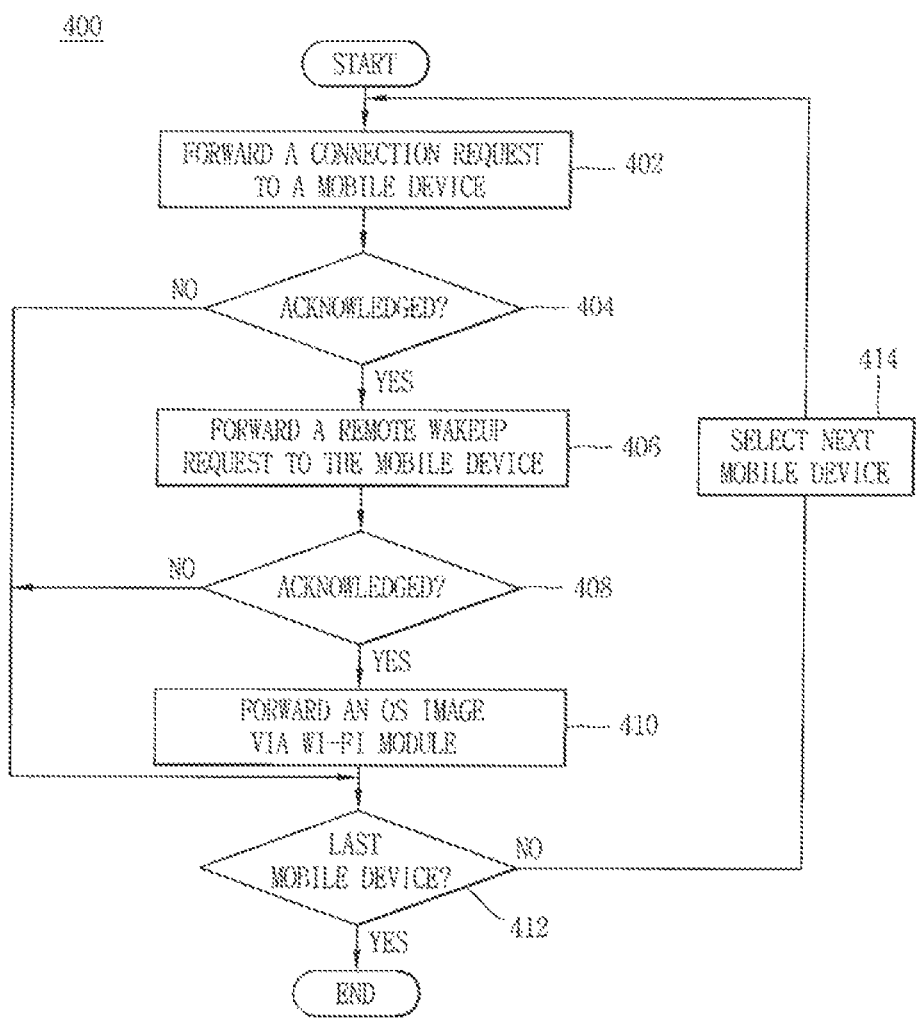
FIG. 4 illustrates a process flow chart of an exemplary method of a server for remotely waking up an application processor of a mobile device, according to one embodiment.

FIG. 4 illustrates a process flow chart 400 of an exemplary method of a server for remotely waking up an application processor of a mobile device, according to one embodiment. In keeping with the previous examples, particular components described with respect to FIG. 1 are referenced as performing the process in FIG. 4. It should be noted that the components that are referred to as performing the process are for illustrative purposes only. In some implementations, other components, or a different combination of components within a system, may instead perform the process in FIG. 4.

In operation 402, as illustrated in FIG. 1, the connection request signal 114 (e.g., a pairing request) is forwarded to the mobile device 104A via the PAN module 118 (e.g., the BT device 122). If the connection request signal 114 (e.g., a pairing request signal) is not acknowledged by the mobile device 104A in operation 404, the connection request signal 114 is sent to next mobile device (e.g., the mobile device 104B) unless the present mobile device is the last one. If the connection request signal 114 (e.g., the pairing request signal) is acknowledged by the mobile device 104A in operation 404, the server 102 forwards a remote wakeup request signal (e.g., the AP on request signal 116) to the mobile device 104A in operation 406. If the remote wakeup request signal is not acknowledged by the mobile device 104A in operation 408, the remote wakeup request signal is sent to next mobile device (e.g., the mobile device 104B) unless the present mobile device is the last one.

If the remote wakeup request signal is acknowledged by the mobile device 104A in operation 408, the OS image 138 is forwarded to the mobile device 104A using the Wi-Fi module 134. If the present mobile device is determined as the last mobile device (e.g., the mobile device 104N), the operation of waking up each mobile device and performing the download of the OS image 138 are brought to end. Otherwise, operations 402 through 410 are repeated once next mobile device is selected in operation 414.

It is appreciated that the methods disclosed in FIG. 4 may be implemented in a form of a machine-readable medium embodying a set of instructions that, when executed by a machine, cause the machine to perform any of the operations disclosed herein.

Figure 5:
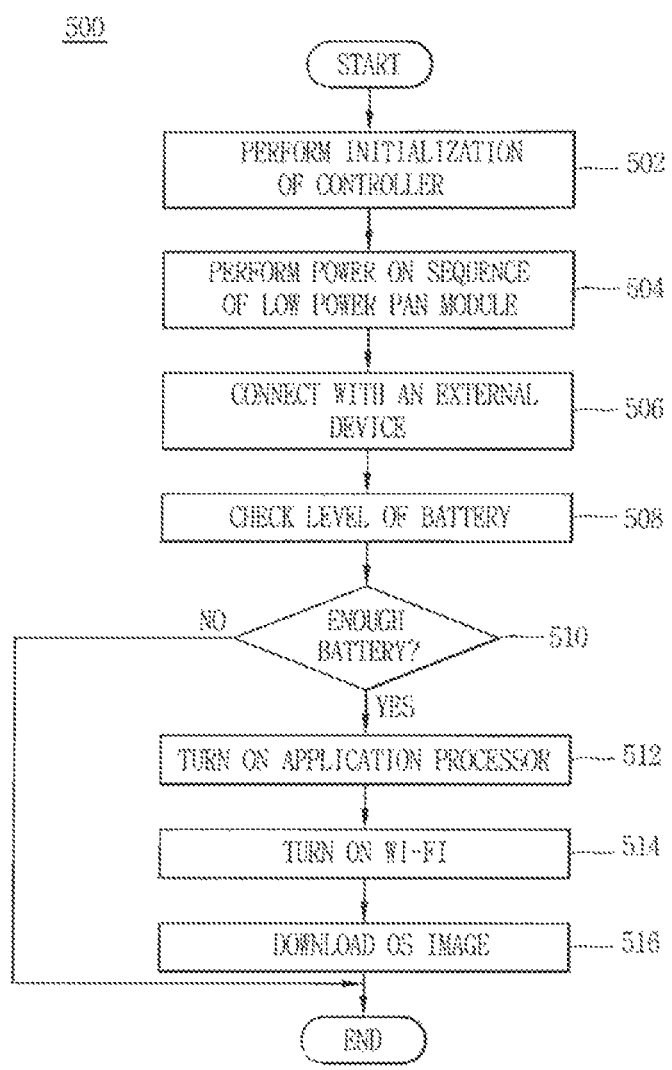
FIG. 5 illustrates a process flow chart of an exemplary method of a mobile device for waking up an application processor of a mobile device, according to one embodiment.

FIG. 5 illustrates a process flow chart 500 of an exemplary method of a mobile device for waking up an application processor of the mobile device, according to one embodiment. In keeping with the previous examples, particular components described with respect to FIG. 2 are referenced as performing the process in FIG. 5. It should be noted that the components that are referred to as performing the process are for illustrative purposes only. In some implementations, other components, or a different combination of components within a system or device, may instead perform the process in FIG. 5.

In operation 502, as illustrated in FIG. 2, the initialization of the controller 208 is performed as the battery 214 (e.g., fully charged) is installed on the mobile device 200. Then, in operation 504, the power on sequence of the low power PAN module 206 is performed. From this on, until the AP 204 is turned on by a request from an external device, the controller 208 as well as the low power PAN module 206 remains in standby mode, thus consuming minimal amount of power from the battery 214. This way, a mobile device (e.g., the mobile device 200) in package can be configured to attune to a wake up signal (e.g., the connection request signal 210 and the AP on request signal 212) from an external device (e.g., the server 102) while consuming minimal amount of power to maintain the monitoring and controlling system and/or device (e.g. the system for waking up AP 202) in standby mode. As the low power PAN module 206 as well as the controller 208 can be maintained using quiescent current from the battery 214, the monitoring and controlling system and/or device may be maintained for many months without any recharging.

When the system for waking up AP 202 is in standby mode in operation 506, the mobile device 200 may connect with the external device when the connection request signal 210 is verified. In operation 508, upon receipt of the AP on request signal 212 from the external device, the level of the battery 214 is checked. If there isn't enough battery required to perform a single task satisfactorily, the mobile device 200 may refrain from acknowledging the external device in response to the AP on request signal 212 and ends the process illustrated in FIG. 5 for the mobile device 200. On the other hand, if there is enough battery in operation 510, the AP 204 of the mobile device 200 is turned on in operation 512.

Then, in operation 514, the AP 204 turns on the Wi-Fi module 136 of FIG. 1 to process data transferred from the external device. The Wi-Fi module 136 (e.g., and/or the Wi-Fi module 134 for the server 102) is selected to transfer large files or large amount of data since Wi-Fi is more equipped to transfer data faster and in farther distance. In operation 516, the OS image 138 is downloaded from the external device to the mobile device 200, thus completing the process. Once the download of the OS image 138 (e.g., or any other task such as remotely running an application) is completed, the AP 204 of the mobile device 200 may be turned off and the system for waking up AP 202 may return to the standby mode until there is another wakeup of the AP 204 or the mobile device 200 is in operation.

It is appreciated that the methods disclosed in FIG. 5 may be implemented in a form of a machine-readable medium embodying a set of instructions that, when executed by a machine, cause the machine to perform any of the operations disclosed herein.

Figure 6:
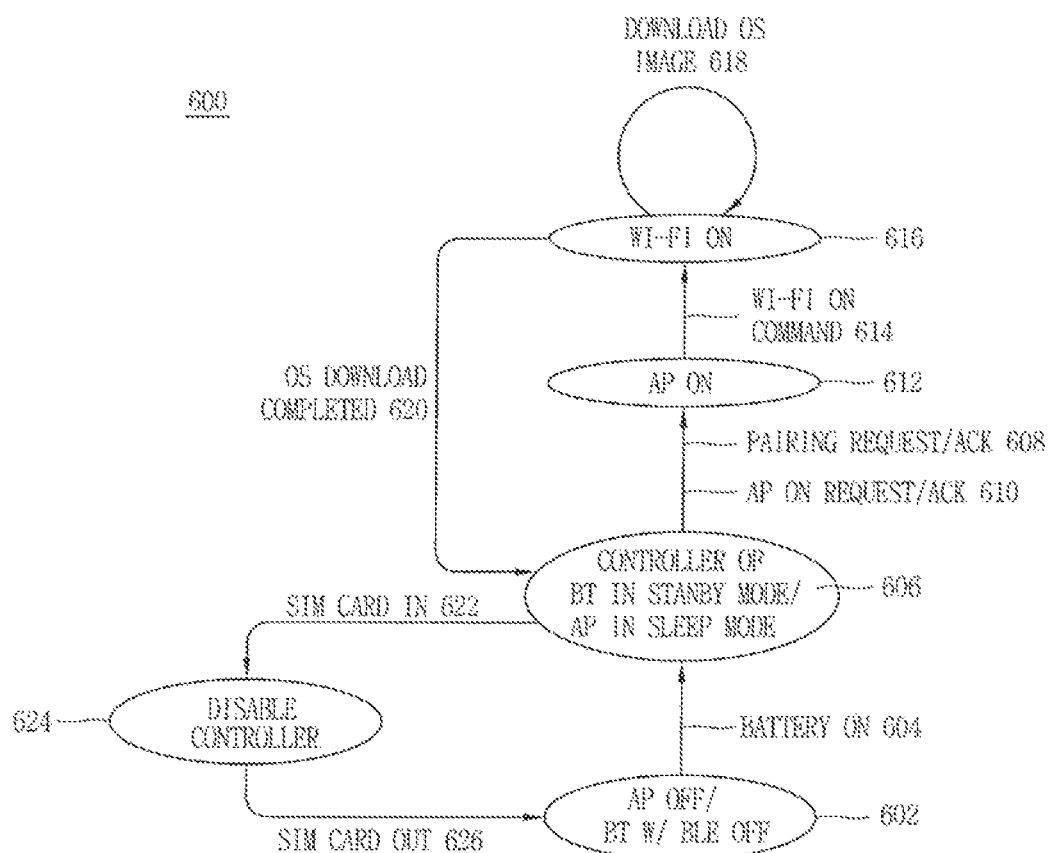
FIG. 6 is a state diagram which illustrates various states of an exemplary mobile device configured for waking up an application processor of a mobile device, according to one embodiment.

FIG. 6 is a state diagram 600 which illustrates various states of an exemplary mobile device configured for waking up an application processor of the mobile device, according to one embodiment. In keeping with the previous examples, particular components in FIG. 1 are referenced to describe the state diagram 600 in FIG. 6. It should be noted that the components that are referred are for illustrative purposes only. In some implementations, other components, or a different combination of components within a system or device, may be used to illustrate the state diagram 600 in FIG. 6.

In FIG. 6, AP OFF/BT W/BLE OFF state 602 is where the mobile device 104A or any one of the mobile devices 104A-N in FIG. 1 is without any power source (e.g., the battery 106). As the battery 106 is inserted to the mobile device 104A, as illustrated in 'battery on' 604 during the packaging process of the mobile device 200, the controller 112 and/or the BT device with BLE feature 124 of the mobile device 104A are switched to the standby mode, where the controller 112 is configured to remain alert for a signal from an external device. During CONTROLLER OF BT W/ BLE IN STANDBY MODE/ AP IN SLEEP MODE state 606, the AP 108 remains in sleep state, thus drawing minimal amount power from the battery 106. This way, the controller 112 of the BT device with BLE feature can remain in the standby mode (e.g., several months) with just quiescent current supplied from the battery 106.

Then, upon the processing of the pairing request and the AP on request, as in 'pairing request/ack' 608 and 'AP on request/ack' 610, the state of the mobile device 104A is moved to AP ON state 612. In the AP ON state 612, the AP 108 of the mobile device 104A is turned on, and the AP 108 takes over the control of the BT device with BLE feature 124. Then, the AP 108 issues a 'Wi-Fi on command' 614 to turn the Wi-Fi module 136, thus arriving at WI-FI ON state 616. When the mobile device 104A is in the Wi-Fi ON state 616, the download of the OS image 138 from the server 102 is performed, as illustrated in step 'download OS image' 618. Further, as the download of the OS image 138 is completed in 620 COS download completed), the state of the mobile device 104A returns to the CONTROLLER OF BT W/BLE IN STANDBY MODE/AP IN SLEEP MODE state 606, where the controller 112 is in the standby mode while the AP 108 is in sleep or deep sleep mode. Then, as the mobile device 104A is brought out from its package and accessed by a user, as 'SIM card in' 622 indicates, the state of the mobile device 104A is transformed to DISABLE CONTROLLER STATE 624, where the controller 112 is disabled in order to prevent the user to temper with the mobile device 200. Further, as the SIM card is brought out as the mobile device 104A is in for service, as indicated in 'SIM card out' 626, the state of the mobile device 104A changes to the AP OFF/BT W/BLE OFF state 602.

Figure 7:
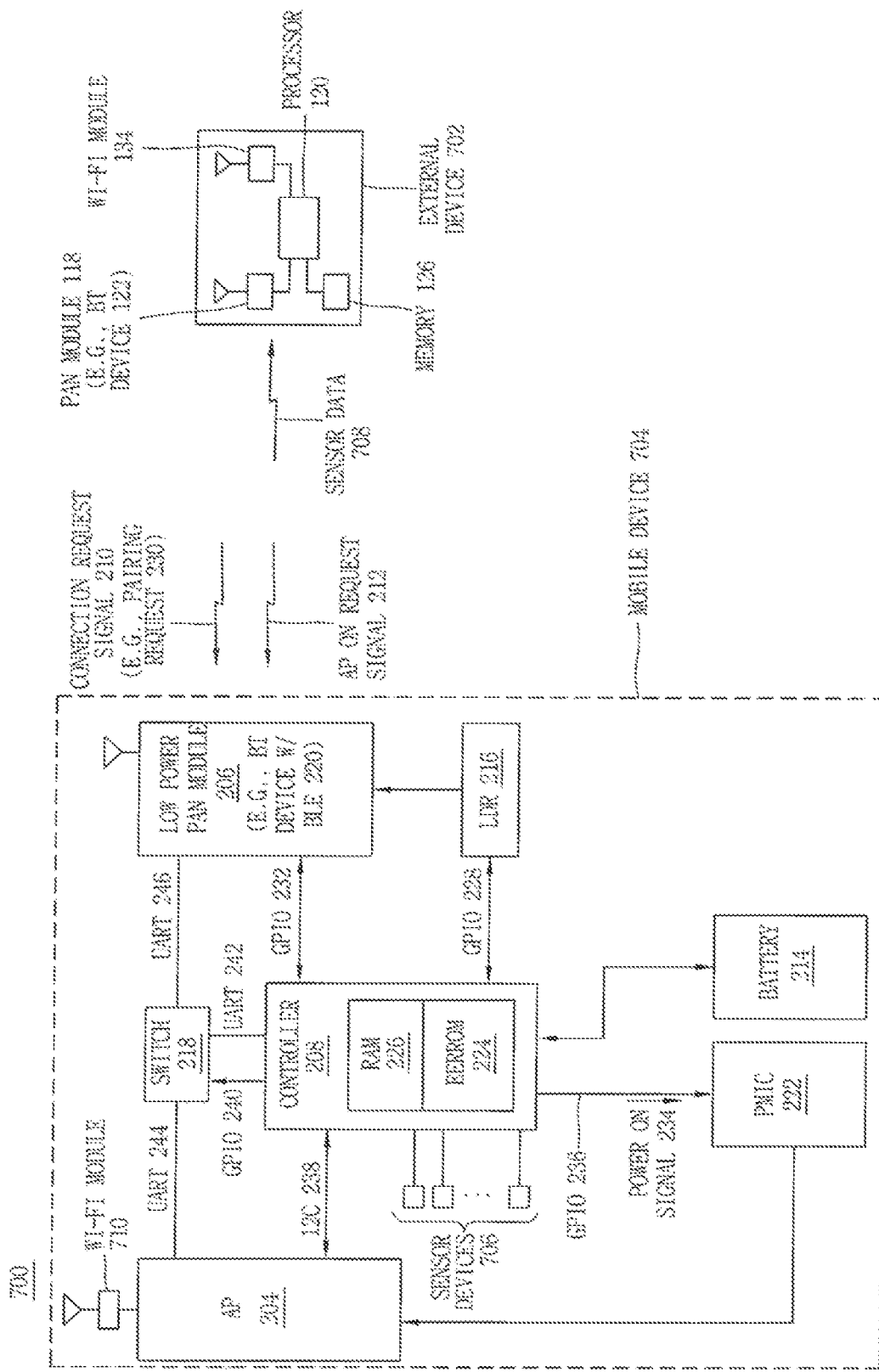
FIG. 7 illustrates an exemplary system of a mobile device for controlling one or more sensor devices, according to one embodiment.

FIG. 7 illustrates an exemplary system of a mobile device 704 for controlling one or more sensor devices 706, according to one embodiment. In FIG. 7, an external device 702 comprises the PAN module 118 (e.g., the BT device 122), the processor 120, the memory 126, and the WI-FI module 134. It is appreciated that the components constituting the external device 702 are similar to those component of the server 102 featured in FIG. 1.

As illustrated in FIG. 7, the mobile device 704 (e.g., a mobile phone) comprises the AP 204, the low power PAN module 206 (e.g., the BT device with BLE feature 220), the controller 208, the battery 214, the LDR 216, the switch 218, the PMIC 222, the EEPROM 224, and the RAM 226. It is appreciated that the components in the mobile device 704 operate in a similar manner to those illustrated in FIG. 2. Further, in one embodiment, a system of the mobile device 704 for controlling the sensor devices 706 comprises the AP 204, the low power PAN module 206 configured to wirelessly communicate with the external device 702 for establishing a connection with the external device 702, the one or more sensor devices 706, and the controller 208 coupled to the AP 204, the low power PAN module, 206 and the sensor devices 706. The one or more sensor devices 706 are directly coupled to the controller 208 rather than to the AP 204. In one embodiment, the controller 208 is configured to monitor a connection request signal communicated from the external device 702 via the low power PAN module 206 while the AP 204 is or remains in a sleep mode. The controller 208 is further configured to generate sensor data 708 by processing each signal from the sensor devices 706 during the sleep mode, where the controller 208 is supplied with quiescent current from the battery 214 of the mobile device 704 during the sleep mode.

In one exemplary implementation, the low power PAN module 206 comprises a BLUETOOTH device with BLUETOOTH low energy (BLE) feature 220 or a BLE device. In one exemplary implementation, the sensor devices 706 comprise one or more of a pressure sensor, an accelerator, a barometer, a bio sensor or other type of sensor device. In one embodiment, the controller is further configured to forward the sensor data 708 to the external device 702 via the low power PAN module 206 while the AP 204 is in the sleep mode. In one embodiment, the system further comprises a WI-FI module 710 coupled to the AP 204. In addition, the controller 208 of the system is further configured to verify the external device 702 upon a receipt of the connection request signal 210, wake up the AP 204 in response to the AP on request signal 212 from the external device 702 when the connection request signal 210 is verified as valid, and forward the sensor data 708 to the external device 702 via the WI-FI module 710 coupled to the AP 204. Further, the controller 208 is configured to wake up the AP 204 according to a schedule (e.g., every hour), and forward the sensor data 708 to the external device 702 via the WI-FI module 710 coupled to the AP 204.

Figure 8:
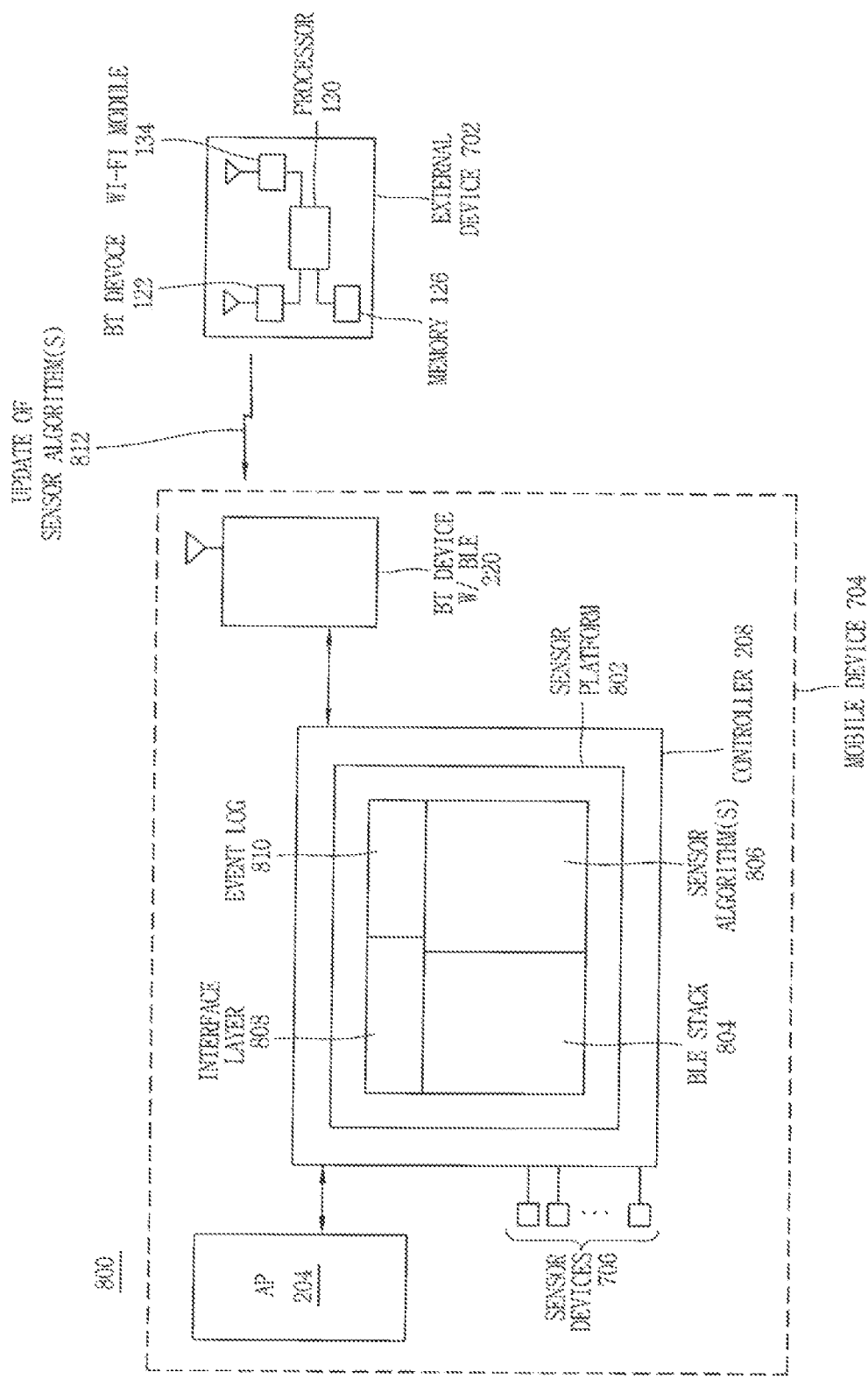
FIG. 8 illustrates an exploded view of the controller in FIG. 7, according to one embodiment.

FIG. 8 illustrates an exploded view 800 of the controller 208 in FIG. 7, according to one embodiment. In FIG. 8, the controller 208 of the mobile device 704 comprises a sensor platform 802 for processing signals to or from the sensor devices 706. In one embodiment, the sensor platform 802 comprises one or more sensor algorithms 806 for controlling the sensor devices 706, an event log 810 associated with the sensor devices 706, and an interface layer 808 for inter-process communication with the sensor devices 706. Further, the sensor platform 802 comprises a BLE stack 804, where the signals received from the sensor devices 706 and processed into the sensor data 708 are forwarded to the external device 702 via the BT device with BLE feature 220. In one exemplary implementation, the external device 702 may be one or more of a mobile phone, a server, a cloud system, or other type of device.

In one embodiment, the interface layer 808 is configured to define the inter-process communication with the AP 204 and/or the inter-process communication with the sensors 706. In one embodiment, the event log 810 is accessed by the external device 702 by accessing the BT device with BLE 220. In one embodiment, an update of the sensor algorithm(s) 806 is received from the external device 702 via the low power PAN module (e.g., the BT device with BLE feature 220) while the AP 204 is in the sleep mode. In one exemplary implementation, the sensor devices 706 comprise one or more of a pressure sensor, an accelerator, a barometer, a health care sensor, and/or other type of sensor.

Figure 9:
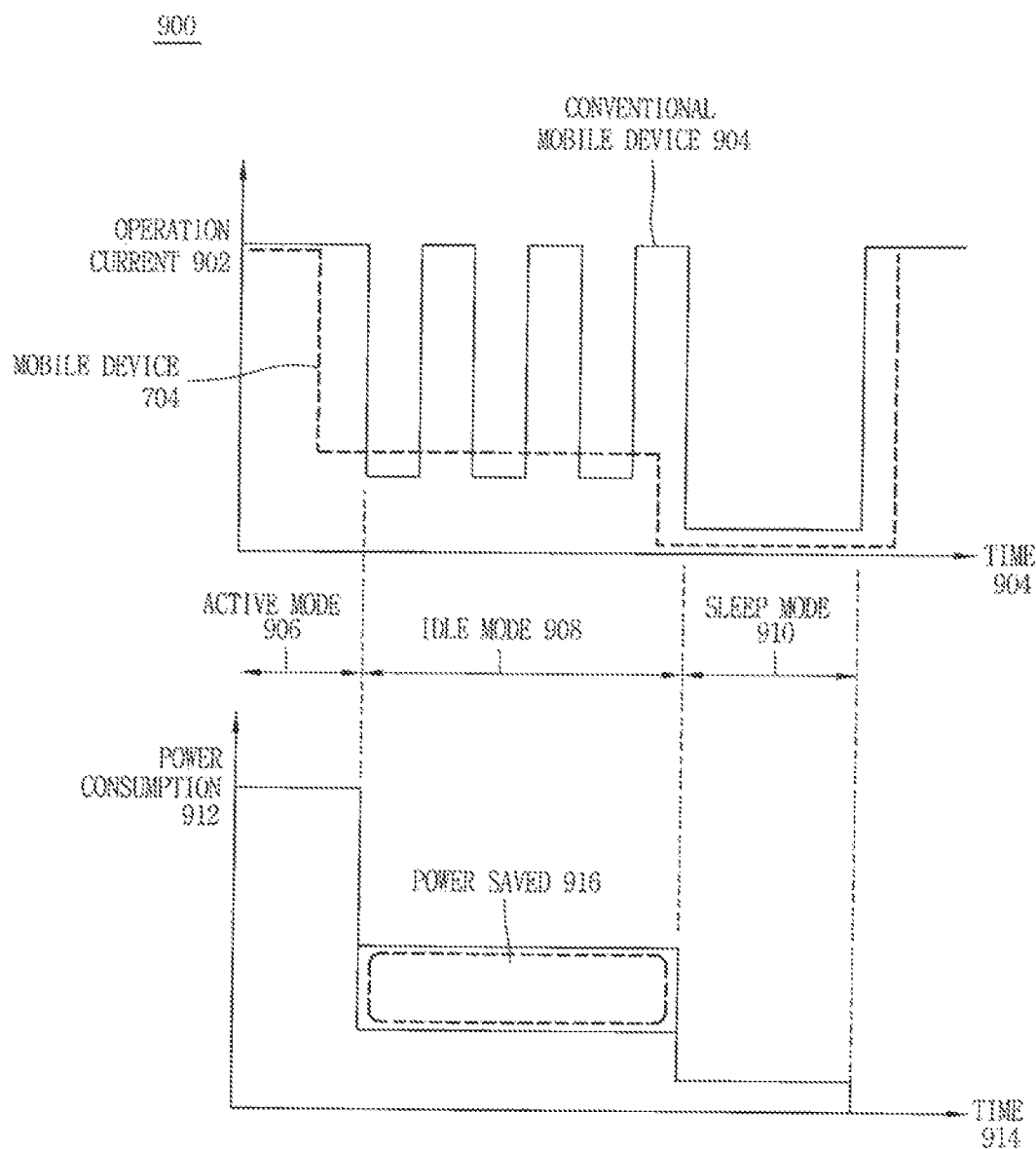
FIG. 9 illustrates graphs representing operation current and power consumed by a conventional mobile device versus operation current and power consumed by the mobile device of FIG. 7.

FIG. 9 illustrates graphs 900 representing operation current and power consumed by a conventional mobile device 904 versus operation current and power consumed by the mobile device 704 of FIG. 7. On the top half of FIG. 9, the graph of the operation current 902 versus time 904 illustrates an operation current 902 consumed by the conventional mobile device 904 and the operation current 902 consumed by the mobile device 704 of FIG. 7. It is appreciated that the conventional mobile device 904 comprises one or more sensor devices directly connected to and thus controlled by the application processor (e.g., the AP 204), whereas the mobile device 704 comprises one or more sensor devices directly connected to and thus controlled by the controller 208. As illustrated in FIG. 9, the conventional mobile device 904 is operated in one of an active mode 906, an idle mode 908, and a sleep mode 910. The application processor of the conventional mobile device 904 is fully operational during the active mode 906, so the operation current 902 drawn by the conventional mobile device 904 is maximal. During the idle mode 908, the application processor is awakened from the sleep mode 910 and performs a function for a short duration. For instance, the application processor may be awakened when one of the sensor devices directly connected to the application processor forwards a signal which needs to be processed by the application processor. During the sleep mode 910, the conventional mobile device 904 draws a minimal amount of the operation current 902.

The top half of FIG. 9 also illustrates a graph of the operation current 902 drawn by the mobile device 704 of FIG. 7 versus the time 904. As illustrated in FIG. 7, the mobile device 704 comprises the controller 208 and the sensor devices 706 directly coupled to the controller 208, and the controller 208 is configured to control the sensor devices 706 without waking up the AP 204, unless it is necessary. Thus, the operation current 902 drawn by the mobile device 704 is significantly less than that of the conventional mobile device 904, especially during the idle mode 904. That is, the AP 204 of the mobile device 704 would not be awakened during the idle mode 908 since the controller 208 can play the role of the AP 204, and this results in the significant saving in the power consumed by the mobile device 704, i.e., power consumption 912, compared to the power consumed by the conventional mobile device 904 as illustrated in power saved 916 at the bottom of FIG. 9. In one exemplary implementation, the average total power consumed by the mobile device 704 (e.g., 6.26 mW) is one tenth of the average total power consumed by the conventional mobile device 904 (e.g., 66.04 mW).

Figure 10:
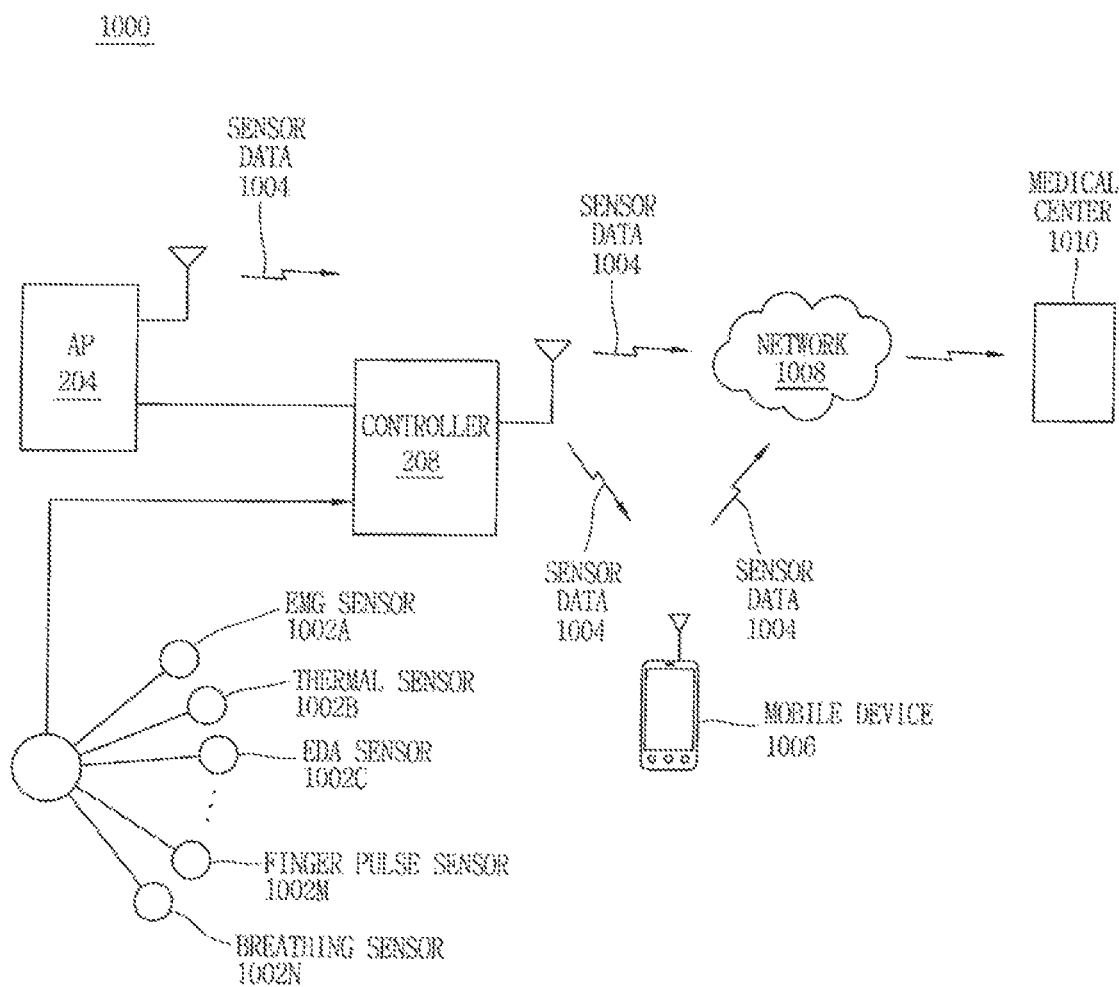
FIG. 10 illustrates an exemplary system of the mobile device in FIG. 7 controlling a number of bio sensors and interacting with one or more external devices or systems, according to one embodiment.

FIG. 10 illustrates an exemplary system 1000 of the mobile device 704 in FIG. 7 controlling a number of bio sensors and interacting with one or more external devices or systems, according to one embodiment. In FIG. 10, the mobile device 704 comprises the AP 204, the controller 208, and the bio sensors (e.g., an EMG sensor 1002A, a thermal sensor 1002B, an EDA sensor 1002C, a finger pulse sensor 1002M, and a breathing sensor 1002N) directly coupled to the controller 208. In one embodiment, the controller 208 processes one or more signals from the bio sensors and generate sensor data 1004 and forwards the sensor data 1004 to an external device and/or system (e.g., a mobile device 1006, a communication system in a medical center 1010) via a network 1008 without waking up the AP 204. The mobile device 704 communicates the sensor data 1004 via the low power PAN module 206.

In one embodiment, the controller 208 processes the signals from the bio sensors, and wake up the AP 204. The sensor data 1004 may be generated by the controller or by the AP 204. The AP 204 forwards the sensor data 1004 via a WI-FI module to the mobile device 1006 or to the communication system in the medical center 1010 via the network 1008.

In one exemplary implementation, when an abnormal health sign of a user in possession of the mobile device 704 is detected by the bio sensors, the controller 208 may forward an alarm signal to another person in possession of the mobile device 1006 or to the medical center 1010 using a low power communication means, such as the low power PAN module 206 in FIG. 7, through the network 1008. Alternatively, upon detecting the abnormal sign of the user via the bio sensors, the controller 208 wakes up the AP 204 and forwards an alarm signal to another person in possession of the mobile device 1006 or to the medical center 1010 using a more powerful communication means, such as the WI-FI module 710, through the network 1008.

FIG. 11 illustrates a process flow chart 1100 of an exemplary method of a mobile device for controlling one or more sensor devices, according to one embodiment. In keeping with the previous examples, particular components described with respect to FIG. 7 are referenced as performing the process in FIG. 11. It should be noted that the components that are referred to as performing the process are for illustrative purposes only. In some implementations, other components, or a different combination of components within a system or device, may instead perform the process in FIG. 11.

In operation 1102, as illustrated in FIG. 7, the sensor data 708 is generated by processing each signal from the sensor devices 706 during the sleep mode of the mobile device 704. In one embodiment, in operation 1104A, the sensor 708 is transmitted to the external device 702 via the low power PAN module 206. In an alternative embodiment, in operation 1104B-1, the external device 702 is verified when the connection request signal 210 is processed by the controller 208. In operation 1104B-2, the AP 204 is awakened when the connection request signal 210 is verified to be valid. In operation 1104B-3, the sensor data 708, which may be stored in a memory of the mobile device, is transmitted to the external device 702 via the WI-FI module 710 coupled to the AP 204. In yet another embodiment, in operation 1104C-1, the AP 204 is awakened according to a set schedule, e.g., every hour, once every three hours, so on). Then, in operation 1104C-2, the sensor data 708 stored in the memory is transmitted to the external device 702 via the WI-FI module 710.

It is appreciated that the methods disclosed in FIG. 11 may be implemented in a form of a machine-readable medium embodying a set of instructions that, when executed by a machine, cause the machine to perform any of the operations disclosed herein.

In various embodiments, the systems, circuits, devices, and methods described in FIGS. 1-11 may monitor and/or process signals from the sensor devices with its AP in the sleep mode. In one embodiment, the mobile device with the system for controlling one or more sensor devices using a low power consuming controller rather than the AP may process signals from the sensor devices while the AP is in the sleep mode. Then, the controller generates sensor data by processing the signals, and forwards the sensor data to an external device via a low power PAN module, such as a BLE device, without waking up the AP. In one embodiment, the controller receives and processes the signals from the sensor devices and stores the sensor data generated based on the signals. Then, the controller wakes up the AP according to a set schedule, forwards the sensor data using a WI-FI module of the mobile device, and then places the AP back to sleep when the transmission of the sensor data is completed. Thus, the system and/or device where the sensor devices are directly controlled by the low power controller instead of the AP may reduce the operation current or power consumed by the mobile device, thus prolonging the battery life of the mobile device.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A system of a mobile device for controlling at least one sensor device, the system comprising:
the at least one sensor device;
an application processor (AP);
a low power personal area network (PAN) module configured to wirelessly communicate with an external device for establishing a connection with the external device;
a controller coupled to the AP, the low power PAN module, and the at least one sensor device, wherein the at least one sensor is directly coupled to the controller, but is not directly coupled to the AP, the controller configured to:
monitor a connection request signal communicated from the external device via the low power PAN module while the mobile device is in a sleep state, wherein when the mobile device is in the sleep state, a quiescent current is supplied to the controller while the quiescent current is not supplied to the AP from a battery of the mobile device;
connect the low power PAN module with the external device based on the connection request signal monitored;
receive each signal directly from the at least one sensor device in response to the connection request signal;

generate sensor data by processing the received each signal; and forward the sensor data to the external device via the low power PAN module, wherein the sleep state of the mobile device is maintained during the connecting, the receiving, the generating, and the forwarding.

2. The system of claim 1, wherein the low power PAN module is a BLUETOOTH device with BLUETOOTH low energy (BLE) feature or a BLE device.

3. The system of claim 1, wherein the at least one sensor device comprises at least one of a pressure sensor, an accelerator, a barometer, or a bio sensor.

4. The system of claim 1, further comprising a WI-FI module coupled to the AP.

5. The system of claim 4, wherein the controller is further configured to:

verify the external device upon receipt of the connection request signal;

wake up the AP in response to an AP on request signal from the external device when the connection request signal is verified as valid, wherein the mobile device is in an operation state when the AP is awake; and forward the sensor data to the external device via the WI-FI module coupled to the AP.

6. The system of claim 4, wherein the controller is further configured to:

wake up the AP according to a schedule; and forward the sensor data to the external device via the WI-FI module coupled to the AP.

7. The system of claim 1, wherein the controller comprises a sensor platform, the sensor platform comprising:

at least one sensor algorithm which corresponds to the at least one sensor device;

an event log associated with the at least one sensor device; and an interface layer for inter-process communication with the at least one sensor device when the mobile terminal is in the sleep state.

8. The system of claim 7, wherein an update of the at least one sensor algorithm is received from the external device via the low power PAN module while the mobile device is in the sleep state.

9. The system of claim 1, wherein the mobile device is a mobile phone.

10. The system of claim 1, wherein the external device is a mobile phone or a cloud computing server.

11. A method for controlling at least one sensor device directly coupled to a controller of a mobile device, the at least one sensor device not directly coupled to an application processor (AP) of the mobile device, the method performed by the controller and comprising:

monitoring, by the controller, a connection request signal communicated from an external device via a low power personal area network (PAN) module of the mobile device while the mobile device is in a sleep state, wherein when the mobile device is in the sleep state, a quiescent current is supplied to the controller while the quiescent current is not supplied to the AP from a battery of the mobile device;

connecting the low power PAN module with the external device based on the connection request signal monitored;

receiving each signal directly from the at least one sensor device in response to the connection request signal; and generating sensor data by processing the received each signal; and forwarding the sensor data to the external device via the low power PAN module, wherein the sleep state of the mobile device is maintained during the connecting, the receiving, the generating, and the forwarding.

12. The method of claim 11, wherein the low power PAN module is a BLUETOOTH device with BLUETOOTH low energy (BLE) feature or a BLE device.

13. The method of claim 11, wherein the at least one sensor device comprises at least one of a pressure sensor, an accelerator, a barometer, or a bio sensor.

14. The method of claim 11, wherein the forwarding the sensor data comprises:

verifying the external device upon receipt of the connection request signal;

waking up the AP in response to an AP on request signal from the external device when the connection request signal is verified as valid, wherein the mobile device is in an operation state when the AP is awake; and transmitting the sensor data to the external device via a WI-FI module coupled to the AP.

15. The method of claim 11, wherein the forwarding the sensor data comprises:

waking up the AP according to a schedule; and transmitting the sensor data to the external device via a WI-FI module coupled to the AP.

16. The method of claim 11, further comprising receiving an update of a sensor algorithm associated with the at least one sensor device from the external device via the low power PAN module while the mobile device is in the sleep state.

17. The method of claim 11, further comprising storing the sensor data to a memory of the controller.

18. A mobile device comprising:

an application processor (AP);

a battery;

a low power personal area network (PAN) module configured to wirelessly communicate with an external device for establishing a connection with the external device;

at least one sensor device; and a controller coupled to the AP, the battery, the low power PAN module, and the at least one sensor device, the AP not directly coupled to the at least one sensor device, the controller configured to:

monitor a connection request signal communicated from the external device via the low power PAN module while the mobile device is in a sleep state, wherein when the mobile device is in the sleep state, a quiescent current is supplied to the controller while the quiescent current is not supplied to the AP from the battery;

connect the low power PAN module with the external device based on the connection request signal monitored;

receive each signal directly from the at least on sensor device in response to the connection request signal; and generate sensor data by processing the received each signal, wherein the sleep state of the mobile device is maintained during the connecting, the receiving, the generating, and the forwarding.

* * * * *